(12) United States Patent
Immonen et al.

(10) Patent No.: US 8,462,724 B1
(45) Date of Patent: Jun. 11, 2013

(54) TRANSMISSION MODE CONTROL FOR INTER-BAND MULTI-CARRIER CAPABLE DEVICES

(75) Inventors: Antti Oskari Immonen, Helsinki (FI); Jouni Kristian Kaukovuori, Vantaa (FI); Tero Henttonen, Espoo (FI); Seppo Rousu, Oulu (FI)

(73) Assignee: Renesas Mobile Corporation, Tokyo (JP)

( * ) Notice: Subject to any disclaimer, the term of this patent is extended or adjusted under 35 U.S.C. 154(b) by 0 days.

(21) Appl. No.: 13/368,537

(22) Filed: Feb. 8, 2012

(30) Foreign Application Priority Data

Jan. 26, 2012 (GB) .................................. 1201334.8

(51) Int. Cl.
H04W 4/00 (2009.01)
H04W 72/00 (2009.01)
H04B 1/44 (2006.01)
H04B 7/00 (2006.01)
H04J 3/16 (2006.01)

(52) U.S. Cl.
USPC ........... 370/329; 370/282; 370/437; 455/450; 455/522

(58) Field of Classification Search
USPC ................. 370/278, 282, 328–329, 334, 339, 370/437; 455/450, 452.2, 522, 101–103
See application file for complete search history.

(56) References Cited

U.S. PATENT DOCUMENTS

| | | | | |
|---|---|---|---|---|
| 7,558,255 | B2 * | 7/2009 | Vasudevan | 370/355 |
| 2008/0255669 | A1 * | 10/2008 | Fallin et al. | 623/17.16 |
| 2010/0111023 | A1 * | 5/2010 | Pelletier et al. | 370/329 |
| 2010/0255868 | A1 * | 10/2010 | Lee et al. | 455/509 |
| 2010/0279621 | A1 * | 11/2010 | Brown et al. | 455/67.11 |
| 2011/0261776 | A1 * | 10/2011 | Ahn et al. | 370/329 |
| 2011/0319120 | A1 * | 12/2011 | Chen et al. | 455/522 |
| 2012/0250742 | A1 * | 10/2012 | Tiirola et al. | 375/219 |
| 2012/0287868 | A1 * | 11/2012 | Sambhwani et al. | 370/329 |

FOREIGN PATENT DOCUMENTS

| | | |
|---|---|---|
| WO | WO 2008/008449 A2 | 1/2008 |
| WO | WO 2010/074500 A2 | 7/2010 |

OTHER PUBLICATIONS

Hua Wang, et al., "Performance of Uplink Carrier Aggregation in LTE-Advanced Systems," Vehicular Technology Conference Fall (VTC 2010-Fall), IEEE, 2010 (pp. 1-5).
UKIPO Search Report under Section 17 dated Jun. 20, 2012 which is issued in a related British Application No. GB1201334.8 (5 pages).

* cited by examiner

*Primary Examiner* — Michael Thier
*Assistant Examiner* — Redentor Pasia
(74) *Attorney, Agent, or Firm* — Lucas & Mercanti LLP; Robert P. Michal

(57) ABSTRACT

There are provided measures for enabling transmission mode control for inter-hand multi-carrier capable devices, such as inter-band carrier aggregation capable devices. Such measure may exemplarily include acquiring at least one output power restriction value for a cumulative output power for a combination of at least two uplink carriers of a terminal device. The two uplink carriers operate on different bands, at the terminal device, and perform transmission mode control in terms of switching between an uplink carrier combination transmission mode and a single uplink carrier transmission mode using the acquired at least one output power restriction value at the terminal device.

20 Claims, 7 Drawing Sheets

TRANSMISSION MODE CONTROL FOR INTER-BAND MULTI-CARRIER CAPABLE DEVICES

FIELD OF THE INVENTION

The present invention relates to transmission mode control for inter-band multi-carrier capable devices. More specifically, the present invention relates to measures (including methods, apparatuses and computer program products) for enabling transmission mode control for inter-band multi-carrier capable devices, such as e.g. inter-band carrier aggregation capable devices.

BACKGROUND

In modern and future (cellular) communication systems, an inter-band multi-carrier capability of devices such as terminal devices is gaining more attention and importance.

For example, in 3GPP systems, inter-band carrier aggregation represents an inter-band multi-carrier communication framework which shall be supported by devices such as terminal devices. In inter-band carrier aggregation, at least two carriers operating on different (frequency) bands are aggregated together in/for at least one of downlink and uplink.

Typically, any inter-band multi-carrier capable devices are operable both in a carrier combination/aggregation transmission mode and a single carrier transmission mode, respectively.

When multiple carriers operating on different (frequency) bands are combined or aggregated (which is regarded as a carrier combination/aggregation transmission mode herein), such as in inter-band carrier aggregation, intermodulation distortion (IMD) is typically produced due to nonlinearity in active and/or passive components of a device transmitter (in case of uplink transmission), a device receiver (in case of downlink transmission) or a device transceiver (in both cases). Generally, intermodulation distortion components of (m+n)-th order are located at frequencies $m^*f_1 \pm n^*f_2$. For instance, assuming that uplink carriers at frequencies $f_{UL1}$ and $f_{UL2}$ are combined or aggregated, a second order intermodulation distortion component is located at one of frequencies $2^*f_{UL1}$, $2^*f_{UL2}$, and $f_{UL1} \pm f_{UL2}$, and a third order intermodulation component is located at one of frequencies $3^*f_{UL1}$, $3^*f_{UL2}$, $2^*f_{UL1} \pm f_{UL2}$, $f_{UL1} \pm 2^*f_{UL2}$, and so on.

When at least one (or part) of the intermodulation distortion components falls in a (frequency) band being used for some transmission operation by the device in question, e.g. a DL carrier, such intermodulation distortion can cause a significant amount of desensitization. Such desensitization is specifically applicable for certain (inter-band) combinations of standardized carriers depending on the frequency relations between uplink and downlink channel definitions.

Namely, for certain frequency relations between uplink and downlink channel definitions, (part of) intermodulation distortion components of uplink carrier combinations hit on top of a downlink carrier and thus destroy the performance thereof, if no additional power restrictions are in place. Referring to 3GPP uplink and downlink channel definitions according to 3GPP TS 36.104 (Table 5.5-1), for example, aggregating bands (i.e. aggregating component carriers operating on bands) B20 and B8 causes a third order intermodulation distortion component from B20 UL (832-862 MHz) and B8 UL (880-915 MHz) to overlap with B8 DL (925-960 MHz). Furthermore, (part of) intermodulation distortion components can also hit on top of some non-3GPP Radio Access Technology (RAT), for instance in the 2.4 GHz frequency band (ISM band) used e.g. by WLAN and Bluetooth. For instance, this is the case for the second order intermodulation distortion component when aggregating bands B4 and B12.

The intermodulation problem as outlined above, i.e. an excessive desensitization of some operating band/carrier (e.g. a DL carrier in case of a multi-band UL carrier combination), can be avoided if the intermodulation power of an intermodulation distortion component is sufficiently low so as compared with the actual transmission power of that operating band/carrier. For instance, desensitization could be considered to be not significant when being smaller than 0.5 dB.

However, there are currently no means for reliably and efficiently ensuring such sufficiently low level of desensitization in the context of intermodulation distortion for inter-band multi-carrier combinations or aggregations, particularly while avoiding coverage problems.

Namely, using band-specific power restriction values such as A-MPR is not effective for inter-band multi-carrier combinations or aggregations. On the one hand, specifying appropriate A-MPR values for all involved bands in all conceivable band/carrier combinations in a reliable manner is not easily feasible or at least cumbersome. On the other hand, even if so, separate power control of individual bands/carriers to be combined may lead to unnecessary or excessive reduction in coverage of the respective uplink/downlink transmissions for avoiding excessive desensitization.

Accordingly, there may be a case where operation in the carrier combination/aggregation transmission mode is not feasible or practicable in terms of requirements on coverage and/or transmission performance, etc.

Otherwise, there may be a case where a device operates in the single carrier transmission mode, although an operation in the carrier combination/aggregation transmission mode might be feasible or practicable in terms of requirements on coverage and/or transmission performance, etc. In such case, the device would waste resources or capabilities in terms of coverage and/or transmission performance, etc.

Thus, there is a desire to provide for transmission mode control for inter-band multi-carrier capable devices. More specifically, is a desire to provide for transmission mode control for inter-band multi-carrier capable devices in terms of at least one of coverage and control flexibility, e.g. in the context of inter-band carrier aggregation.

SUMMARY

Various exemplary embodiments of the present invention aim at addressing at least part of the above issues and/or problems and drawbacks.

Various aspects of exemplary embodiments of the present invention are set out in the appended claims.

According to an exemplary aspect of the present invention, there is provided a method comprising acquiring at least one output power restriction value for a cumulative output power for a combination of at least two uplink carriers of a terminal device, said two uplink carriers operating on different bands, at the terminal device, and performing transmission mode control in terms of switching between an uplink carrier combination transmission mode and a single uplink carrier transmission mode using the acquired at least one output power restriction value at the terminal device.

According to an exemplary aspect of the present invention, there is provided an apparatus (which may e.g. be arranged/configured for use on a terminal side of a cellular system), comprising at least one processor, at least one memory including computer program code, and at least one interface configured for communication with at least another apparatus, the at least one processor, with the at least one memory and the computer program code, being arranged/configured to cause the apparatus to perform: acquiring at least one output power restriction value for a cumulative output power for a combination of at least two uplink carriers of a terminal device, said two uplink carriers operating on different bands, at the terminal device, and performing transmission mode control in terms of switching between an uplink carrier combination transmission mode and a single uplink carrier transmission mode using the acquired at least one output power restriction value at the terminal device.

According to an exemplary aspect of the present invention, there is provided a computer program product comprising computer-executable computer program code which, when the program is run on a computer (e.g. a computer of an apparatus according to the aforementioned apparatus-related exemplary aspect of the present invention), is configured to cause the computer to carry out the method according to the aforementioned method-related exemplary aspect of the present invention.

Such computer program product may comprise or be embodied as a (tangible) computer-readable (storage) medium or the like on which the computer-executable computer program code is stored, and/or the program may be directly loadable into an internal memory of the computer or a processor thereof.

Advantageous further developments or modifications of the aforementioned exemplary aspects of the present invention are set out in the following.

By virtue of any one of the aforementioned exemplary aspects of the present invention, a transmission mode control for inter-band multi-carrier capable devices is achievable, which is effective in terms of at least one of coverage and control flexibility, e.g. in the context of inter-band carrier aggregation.

By way of exemplary embodiments of the present invention, there is provided transmission mode control for inter-band multi-carrier capable devices. More specifically, by way of exemplary embodiments of the present invention, there are provided measures and mechanisms for enabling transmission mode control for inter-band multi-carrier capable devices (in/for cellular communication systems), such as e.g. inter-band carrier aggregation capable devices.

Thus, enhancements are achieved by methods, apparatuses and computer program products enabling transmission mode control for inter-band multi-carrier capable devices.

BRIEF DESCRIPTION OF DRAWINGS

For a more complete understanding of exemplary embodiments of the present invention, reference is now made to the following description taken in connection with the accompanying drawings in which.

DESCRIPTION OF EXEMPLARY EMBODIMENTS

Figure 1:
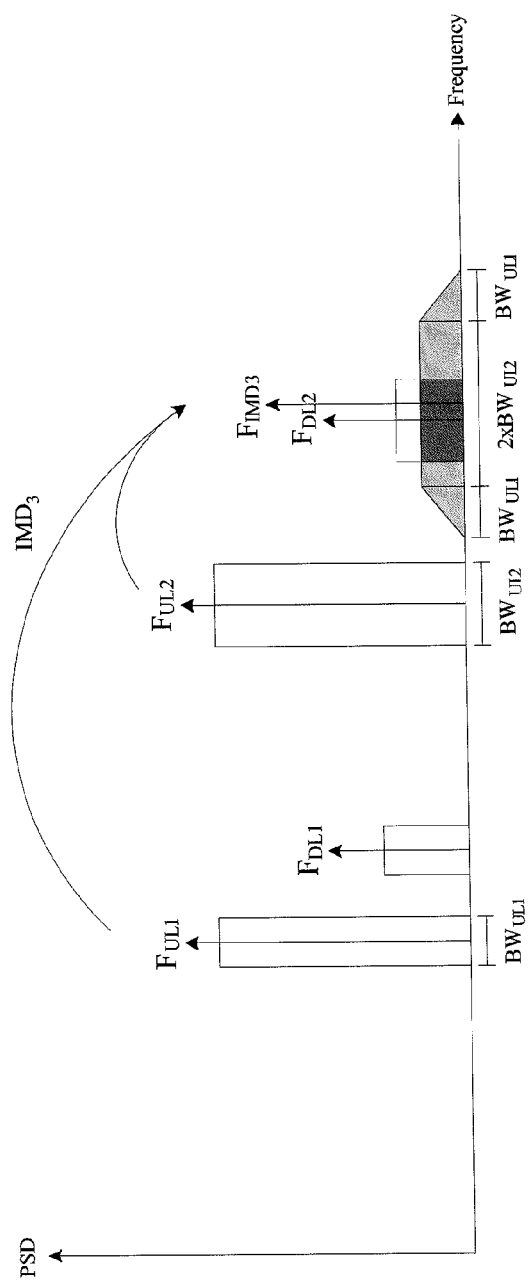
FIG. 1 shows a diagram of an example of third order intermodulation distortion on a downlink band, for which exemplary embodiments of the present invention are applicable.

Exemplary aspects of the present invention will be described herein below. More specifically, exemplary aspects of the present are described hereinafter with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to 3GPP specifications being used as non-limiting examples for certain exemplary network configurations and deployments. In particular, a LTE/LTE-Advanced communication system is used as a non-limiting example for the applicability of thus described exemplary embodiments. As such, the description of exemplary embodiments given herein specifically refers to terminology which is directly related thereto. Such terminology is only used in the context of the presented non-limiting examples, and does naturally not limit the invention in any way. Rather, any other network configuration or system deployment, etc. may also be utilized as long as compliant with the features described herein.

In particular, the present invention and its embodiments may be applicable in any (cellular) communication system and/or network deployment operable with inter-band multi-carrier capable devices, e.g. in any (cellular) communication system and/or network deployment supporting inter-band carrier aggregation or the like.

Hereinafter, various embodiments and implementations of the present invention and its aspects or embodiments are described using several alternatives. It is generally noted that, according to certain needs and constraints, all of the described alternatives may be provided alone or in any conceivable combination (also including combinations of individual features of the various alternatives).

According to exemplary embodiments of the present invention, in general terms, there are provided mechanisms, measures and means for enabling transmission mode control for inter-band multi-carrier capable devices.

In the following, exemplary embodiments of the present invention are described with reference to methods, procedures and functions, as well as with reference to structural arrangements and configurations.

More specifically, without restricting generality, the present invention and exemplary embodiments thereof are described with reference to a 3GPP-based LTE communication system and inter-band carrier aggregation therein.

As used herein, any references to aggregation or combination of bands (in the context of carrier aggregation) encompasses or corresponds to aggregation or combination of component carriers operating on respective bands.

FIG. 1 shows a diagram of an example of third order intermodulation distortion on a downlink band, for which exemplary embodiments of the present invention are applicable. In FIG. 1, the power spectral density is plotted over the frequency.

Regarding FIG. 1, it is noted that only third order intermodulation distortion is illustrated as a non-limiting example of a distortion/interference source. Nonetheless, other distortion/interference sources are equally applicable in the context of exemplary embodiments of the present invention. For example, at least in some operational cases, harmonics of certain carriers and/or adjacent channel powers (according to ACLR) of fundamental carrier powers and/or adjacent channel powers (according to ACLR) of harmonic carrier powers and/or intermodulation distortion results of ACLR may also be applicable and, thus, may be taken into account. In FIG. 1, such other conceivable distortion/interference sources are not illustrated for the sake of clarity only.

For the example of FIG. 1, it is generally assumed that two uplink carriers of different bands are combined, wherein (part of) a third order intermodulation distortion component is caused to fall on the downlink carrier of one of the two different bands. For illustrating the different effects of the two uplink carriers in the third order intermodulation distortion component, the two different bands are exemplarily assumed to have different bandwidths. In this regard, it is to be noted that, according to operational use cases, bandwidths of different bands may be also equal, and exemplary embodiments of the present invention are equally applicable for bands with the same or different bandwidths. In the present example, output powers of two uplink carriers may vary independently according to network power control commands for both components, and it is to be noted that exemplary embodiments of the present invention are equally applicable for any output powers and output power relationships of bands. Further, it is assumed that the third order intermodulation distortion component exhibits twice the effect of the uplink carrier 2 as compared with the uplink carrier 1, i.e. $F_{IMD3}=F_{UL1}\pm 2*F_{UL2}$. Accordingly, the downlink carrier of the second band suffers from desensitization, as described above.

Generally, it is to be noted that the following equations adopt simple adding operations, thus combining powers herein is simple, for instance 10 dB+10 dB=20 dB and not 13 dB.

In case of second order intermodulation, the intermodulation power of intermodulation (IMD2) is given by $$P_{IMD2}=Px+Py-IIP2, \qquad (1)$$

wherein Px is the power of the victim band uplink (e.g. UL2), Py is the power of the jammer band uplink (e.g. UL1), i.e. the power of another (isolated) uplink antenna, and IIP2 is the second order intermodulation performance parameter e.g. of a front-end antenna switch.

The equation (1) can be written as $$P_{IMD2}=P1+(P2-ANT_{ISOLATION})-IIP2, \qquad (2)$$

wherein P1 and P2 are the TX powers of the uplinks UL1 and UL2, respectively, $ANT_{ISOLATION}$ is an antenna isolation, and IIP2 is the intermodulation performance parameter.

In case of third order intermodulation, the intermodulation power of intermodulation (IMD3) is given by $$P_{IMD3}=2\cdot Px+Py-2\cdot IIP3, \qquad (3)$$

and the equation (3) can be written as $$P_{IMD3}=2\cdot P1+(P2-ANT_{ISOLATION})-2\cdot IIP3, \qquad (4)$$

wherein IIP3 is the third order intermodulation performance parameter e.g. of a front-end antenna switch.

In equations (2) and (4), $ANT_{ISOLATION}$ and IIP2/IIP3 represent device-specific parameters of the device in question, e.g. a terminal device such as a UE. The antenna isolation is a device-specific parameter/value which alters between at least one of devices, antennas, frequencies, active antenna locations, and use cases (hand effects, mechanical structures positioning, etc.), and the intermodulation performance parameter IIP2/IIP3 are device-specific (typically component) parameters/values, i.e. constants typically given (guaranteed) by the component manufacturer.

As rule of thumb, which is adopted herein by way of example only, desensitization shall not exceed 0.5 dB. This means that the IMD power should be 10 dB below reference sensitivity (B_xy_refsens).

When trying to use conventional band-specific power restriction values such as A-MPR, appropriate power restrictions for individual inter-band uplinks being combined would be extremely difficult and unreliable to define, as outlined hereinafter as a comparative example.

Referring to equations (2) and (4) above, it is evident that (almost) the only way to define power restrictions would be to assume UL2 without A-MPR and then calculate the maximum output power for UL1 according to e.g. equation (2) or (4). Thereby, the maximum power reduction needed for UL1 could be obtained, that ensures desensitization of less than 0.5 dB independent of the UL2 TX power. After that, the same operation would need to be done for UL2. Even after that, the actual power restriction is not unambiguously clear, since both ULs can actually not be restricted according to the calculation where another UL is without A-MPR.

In order to clarify this, a short example is given of the IMD2 calculation described above using equation (2).

Therein, since the maximum output power device (e.g. UE) is defined by (23+−3 dBm), the maximum output power per band is assumed to be 20 dB. Further, the following values are exemplarily assumed:

$ANT_{ISOLATION}$=20 dBm
IIP2=115 dBm
P2=20 dBm
B_xy_refsens=−94 dBm ⇒ $P_{IMD}$=−104 dB (i.e. 10 dB below B_xy_refsens to guarantee desensitization of less than 0.5 dB).

For UL1, equation (2) thus reads: P1+20−20−115=−104 dBm

Accordingly, the maximum output power P1 for UL1 is P1=11 dBm (i.e. respective A-MPR would be 20−11=9 dB)

For UL2, equation (2) thus reads: 20+P2−20−115=−104 dBm

Accordingly, the maximum output power P2 for UL2 is P2=11 dBm (i.e. respective A-MPR would be 20−11=9 dB)

However, despite the result of these exemplary calculations, restrictively defining that the maximum output power is 11 dBm per band is not appropriate. On the other hand, it is not appropriate to restrictively define that, assuming another band is transmitting at +20 dBm, the maximum allowed output power for another band is 11 dBm.

In brief, current A-MPR signaling would have to be in the form of:
A dB for P1 (according to the above example e.g. A=9 dB)
B dB for P2 (according to the above example e.g. B=9 dB)
a fixed restriction for P1, e.g. +20 dBm
a fixed restriction for P2, e.g. +20 dBm A band-specific network signaling value (giving e.g. A-MPR) is included in both A and B.

Accordingly, it is not appropriate to use band-specific power restriction values such as A-MPR for defining power restrictions for individual inter-band uplinks being combined.

According to exemplary embodiments of the present invention, power restriction values for combinations of inter-band uplinks, i.e. combination- or aggregation-specific power restriction values and their usage for transmission mode control for/at inter-band multi-carrier capable devices are proposed, as explained hereinafter.

In order to clarify this, short examples are given of IMD calculations described above using the above equations, which use the same example values as the above example for conventional band-specific power restriction values.

Namely, since the maximum output power per device (e.g. UE) is defined by (23+−3 dBm), the maximum output power per band is assumed to be 20 dB. Further, the following values are exemplarily assumed:

$ANT_{ISOLATION}$=20 dBm

B_xy_refsens=−94 dBm $\Rightarrow P_{IMD2}$=−104 dB (i.e. 10 dB below B_xy_refsens to guarantee desensitization of less than 0.5 dB).

For IMD2, assuming IIP2=115 dBm, equation (2) thus reads:

$P1+P2-20-115=-104$ dBm

Accordingly, the value for P1+P2, which is an example of an output power restriction value for a cumulative output power for a combination of the two uplinks UL1 and UL2 according to exemplary embodiments of the present invention, denoted as C herein, is $C=P1+P2=-104-(-115)-(-20)=31$ dBm For IMD3, assuming IIP3=68 dBm, equation (4) thus e.g. reads:

$2*P1+P2-20-2*68=-104$ dBm

This is the case when assuming that UL1 is the victim band uplink, while 2*P1+P2 would be replaced by P1+2*P2 when assuming that UL2 is the victim band uplink. That is to say, the coefficient depends on the victim band.

Accordingly, the value for 2*P1+P2, which is an example of an output power restriction value for a cumulative output power for a combination of the two uplinks UL1 and UL2 according to exemplary embodiments of the present invention, denoted as C herein, is $C=2*P1+P2=-104-(-2*68)-(-20)=52$ dBm According to exemplary embodiments of the present invention, at least one output power restriction value for a cumulative output power for a combination of at least two uplinks is employed for transmission mode control for/at inter-band multi-carrier capable devices.

Accordingly, as a result of the above example, the output power restriction value/s C being utilized could be in the form of:

$C=P1+P2=31$ dBm for IMD2, and/or $C=2*P1+P2=52$ dBm or $C=P1+2*P2=52$ dBm for IMD3.

According to exemplary embodiments of the present invention, the output power restriction value/s C could be represented as an indication of a maximum allowable output power value of the combination of uplinks, as exemplified above. Otherwise, according to exemplary embodiments of the present invention, the output power restriction value/s C could also be represented as an indication of a maximum output power reduction value of the combination of uplinks.

For the latter case, power restriction related signaling according to exemplary embodiments of the present invention could have to be in the form of:

$C=P1+P2=31$ dBm for IMD2, and/or $C=2*P1+P2=52$ dBm or $C=P1+2*P2=52$ dBm for IMD3, and a fixed restriction (i.e. a maximum allowable output power value) per band, e.g. +20 dBm.

According to exemplary embodiments of the present invention, power restriction related signaling could have to be in the form of:

NS_xy dB for P1,

NS_yx dB for P2, $C=P1+P2=31$ dBm for IMD2, and/or $C=2*P1+P2=52$ dBm or $C=P1+2*P2=52$ dBm for IMD3, and a fixed restriction (i.e. a maximum allowable output power value) per band, e.g. +20 dBm.

The values NS_xy and NS_yx included in this exemplary signaling are band-specific network signaling values (giving band-specific output power restriction values such as e.g. A-MPR), which are given in addition to the combination-specific output power restriction value C. It is noted that xy and yx in NS_xy and NS_yx constitute placeholders which may represent any number, e.g. NS_01, NS_02, and so on. That is to say, corresponding information according to exemplary embodiments of the present invention may be signaled in any (specified) network signaling (NS) value.

The referenced NS values are not output power reduction values themselves, but may contain e.g. a table of output power reduction values (e.g. A-MPR values) which depend on different conditions (number of RBs, CC placement etc.). Therefore, the amount of e.g. A-MPR in a NS value can vary from 0 to 12 dB within NS_xy or NS_yx, for example.

Such signaling example is in compliance with current specifications, which prescribe signaling of such values relating to coexistence scenarios between certain bands. In such example, the UE needs to ensure that both conditions on the basis of C and NS_xy/NS_yx are satisfied.

For example, in case of IMD2, when assuming C=35 dB, NS_xy gives A-MPR$_{P1}$=5 dB and NS_yx gives A-MPR$_{P2}$=0 dB, the UE can give up to P1=23−5 dB=18 dB for the band relating to the NS_xy signaling value, and can give up to P2=35−18=17 dB for the band relating to the NS_yx signaling value. Thereby, excessive output powers could be avoided, which could make the relevant IMD2 distortion component too large, as compared with a case in which only band-specific output power restriction values are signaled and used for power control (in which case the sum of resulting band-specific output powers of 18 dB and 23 dB would amount to an excessive value of 41 dB).

Figure 2:
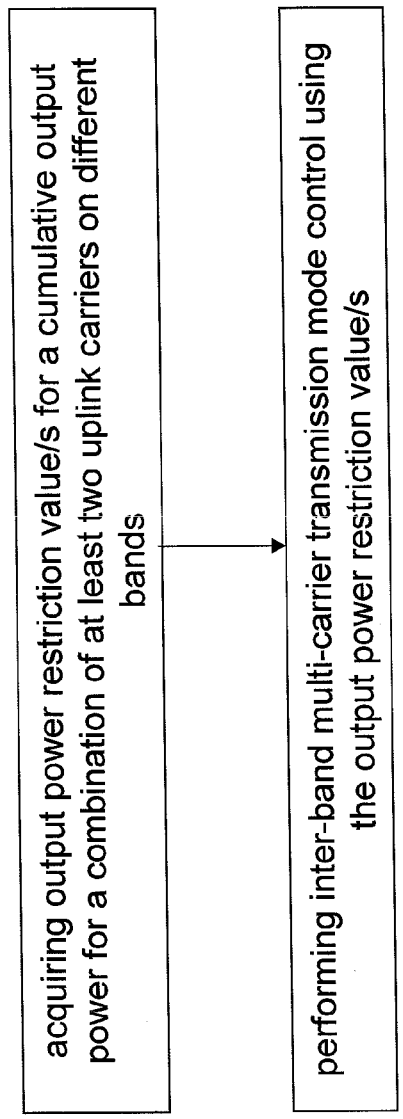
FIG. 2 shows a flowchart of an exemplary method according to exemplary embodiments of the present invention.

FIG. 2 shows a flowchart of an exemplary method according to exemplary embodiments of the present invention.

The method according to FIG. 2 is operable at a device/terminal, i.e. at a device or terminal such as a UE, and comprises an operation of acquiring at least one output power restriction value for a cumulative output power for a combination of at least two uplink carriers of the device/terminal, said two uplink carriers operating on different bands, and an operation of performing transmission mode control in terms of switching between an uplink carrier combination transmission mode and a single uplink carrier transmission mode using the acquired at least one output power restriction value.

Stated in other words, acquisition of the output power restriction value/s at the device/terminal triggers transmission mode control at the device/terminal insofar as it is determined whether a transmission mode switching is necessary or possible.

According to exemplary embodiments of the present invention, the combination-specific output power restriction value/s may be acquired at the device/terminal in any conceivable manner. For example, the device/terminal may acquire the combination-specific output power restriction value/s by way of receiving a corresponding signaling from the network side (as exemplarily illustrated in FIG. 3), by having been pre-configured according to a certain set of values for the used carrier configuration, or the like.

According to exemplary embodiments of the present invention, the transmission mode control at the device/terminal may comprise a hysteresis management functionality being configured to avoid excessive hysteresis between the transmission modes. In such hysteresis management, the device/terminal may base its decision for the applicability of a mode switching e.g. on network conditions, any available output power restriction value or values, battery capacity, whether there is a connection to power supply, which applications/services are active, movement of the device, CA band combination, TX resources, RX resources, or the like.

Figure 3:
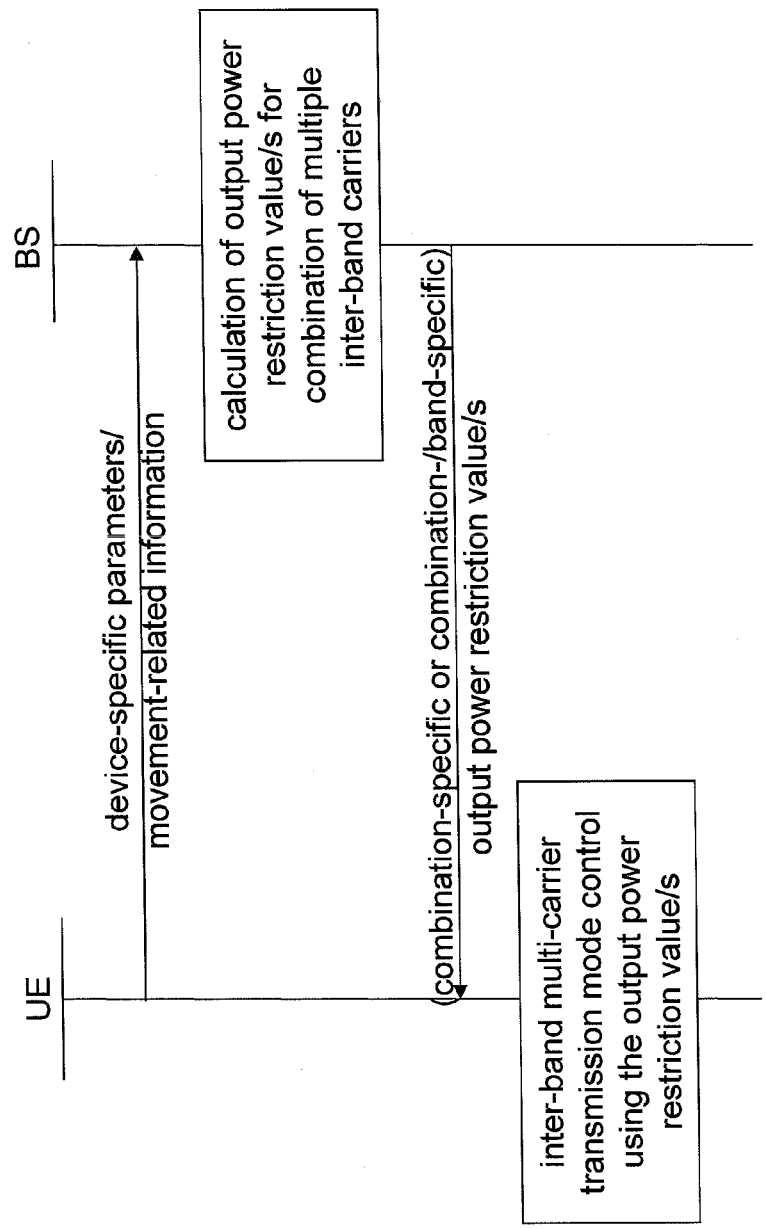
FIG. 3 shows a schematic diagram of an exemplary procedure according to exemplary embodiments of the present invention.

FIG. 3 shows a schematic diagram of an exemplary procedure according to exemplary embodiments of the present invention. In FIG. 3, optional features of the thus illustrated procedure are depicted with dashed lines. As shown in FIG. 3, a procedure according to exemplary embodiments of the present invention comprises the following operations/functions.

At the device/terminal side, i.e. at a device or terminal such as a UE, the combination-specific output power restriction value/s is/are exemplarily acquired by way of receiving a corresponding signaling (or signaling message) from the network side, i.e. a base station or access node (BS) such as a eNB or the like. Thereupon, the transmission mode control in terms of switching between an uplink carrier combination transmission mode and a single uplink carrier transmission mode using the acquired combination-specific output power restriction value/s is performed at the device/terminal.

According to exemplary embodiments of the present invention, an uplink carrier combination transmission mode is an operation mode where the device/terminal combines or aggregates multiple carriers operating on different (frequency) bands for uplink transmission, such as in inter-band carrier aggregation, and a single uplink carrier transmission mode is an operation mode where the device/terminal uses a single carrier for uplink transmission. In both transmission modes, the device/terminal may use an arbitrary number of carriers for downlink transmission, i.e. the device/terminal may use carrier combination/aggregation or single carrier downlink transmission.

According to exemplary embodiments of the present invention, the at least one output power restriction value may be calculated at the network side, i.e. at a base station or access node (BS) such as a eNB or the like, and then signaled to the device/terminal. This relates to both combination-specific output power restriction value/s applicable to a carrier combination and/or band-specific output power restriction value/s applicable to a single carrier (as mentioned below).

According to exemplary embodiments of the present invention, any output power restriction value C is calculated on the basis of an intermodulation power equation for the intermodulation power of the at least two uplink carriers. For example, the above second- and third-order intermodulation power equations for $P_{IMD2}$ and $P_{IMD3}$ could be used in this regard, as exemplified in the above example. When using such intermodulation power equations, an allowable intermodulation power is to be specified or assumed (in the above example, −104 dBm), and one or more related device-specific parameters of the terminal device are to be employed (in the above example, $ANT_{ISOLATION}$ and IIP2/IIP3). For example, values of $ANT_{ISOLATION}$ and IIP2/IIP3 may be read from look up tables. In some embodiments, a terminal may execute measurements to define isolation value/s between antennas and/or other relevant parameters/values so as to derive corresponding values.

According to exemplary embodiments of the present invention, one or more of the device-specific parameters required to calculate the power restriction value/s at the network side, may be notified from the UE to the BS. In the above example, $ANT_{ISOLATION}$ and IIP2/IIP3 could be signaled in this way. Further, the BS may be notified from the UE with information regarding a movement state of the device/terminal, e.g. whether the UE is a moving or non-moving device and/or speed information. The BS may use such movement-related information to calculate the power restriction value/s at the network side. Namely, with a non-moving or slowly moving device, the network may use e.g. different algorithms or margins than with a moving or rapidly moving device.

The device-specific parameters and/or the movement-related information may be notified on demand, e.g. upon request from the network side and/or after having been changed. Such notification from the device/terminal is effective in that the device/terminal knows its own device-specific parameters and/or movement-related information, which may be based on current measurement or detection and/or standard values or positioning (which may e.g. be pre-stored in the course of manufacturing or product testing, etc.).

According to exemplary embodiments of the present invention, any output power restriction value C may be calculated as a maximum allowable output power value. This may be accomplished by direct usage of respective intermodulation power equations. Also, any output power restriction value C may be calculated as a maximum output power reduction value. This may be accomplished by calculating a difference between a maximum output power and a maximum allowable output power value being directly derivable from respective intermodulation power equations.

Furthermore, in the calculation of the output power restriction value/s, network conditions may also be taken into consideration. This may be involved in the context of setting required output powers for UEs by the network (i.e. when the network asks the UEs to increase/decrease power depending on the network conditions). In this regard, e.g. the longer the distance between the base station and the device/terminal and/or the higher the interference level on some uplink transmission, the more power the base station requires the device/terminal to use for uplink transmissions.

According to exemplary embodiments of the present invention, any output power restriction value may comprise an output power restriction value for each combination of uplink carriers of the terminal device, or an output power restriction value for those combinations of uplink carriers of the terminal device, which cause intermodulation distortion on at least one of a downlink carrier and a reception band of the terminal device, or an output power restriction value for a group of combinations of uplink carriers of the terminal device, which cause a specific order intermodulation distortion (i.e. an intermodulation distortion of a specific order) on at least one of a downlink carrier and a reception band of the terminal device.

Exemplary embodiments of the present invention comprise usage of power restriction values per all combined ULs or, at least, per all relevant combined ULs (e.g. those ULs being usable at the UE and/or those ULs causing intermodulation distortion in relevant band/s). Further, instead of defining different power restriction values for each (relevant) band combination, power restriction values for certain (relevant) band combination could also be grouped, e.g. based on a root for interference or order of IMD (e.g. IMD2, IMD3, and so on). Accordingly, as in the above example, a power restriction value C could be defined for IMD2 and a power restriction value C could be defined for IMD3. Thus, there could in practice be around 2 to 5 different power restriction values needed to tackle all relevant inter-band combinations with intermodulation distortion problems.

According to exemplary embodiments of the present invention, besides the combination-specific output power restriction value/s C, band-specific output power restriction values (e.g. given by NS_xy/NS_yx) for the at least two uplink carriers may additionally be signaled from the BS to the UE. In this case, the UE may acquire both types of output power restriction values and may perform the transmission mode control using the acquired combination-specific output power restriction values and the acquired band-specific output power restriction values. In this regard, reference is made to the above signaling example including both C and NS_xy/NS_yx values.

Figure 4:
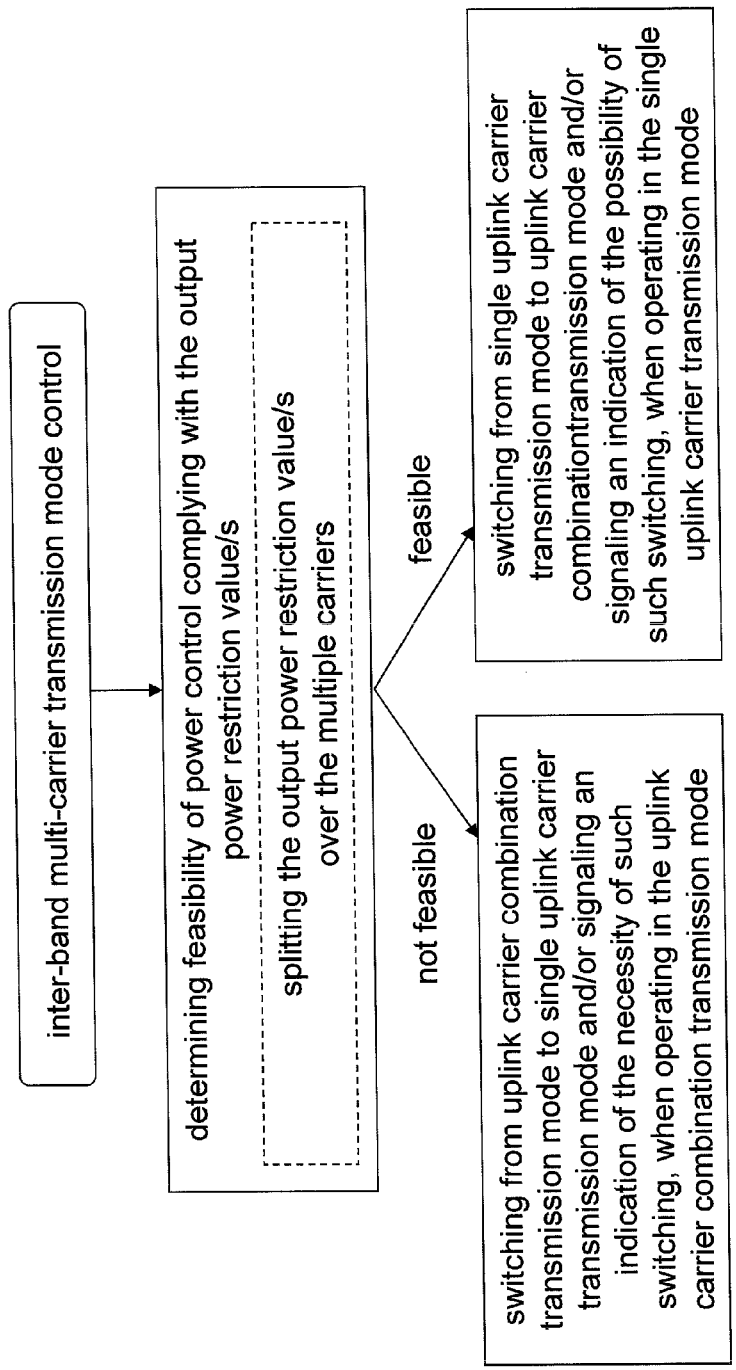
FIG. 4 shows a flowchart diagram of an exemplary procedure at a device according to exemplary embodiments of the present invention.

FIG. 4 shows a flowchart diagram of an exemplary procedure at a device according to exemplary embodiments of the present invention. Namely, FIG. 4 illustrates a procedure for inter-band multi-carrier transmission mode control using the at least one output power restriction value according to FIG. 2 or 3. In FIG. 4, optional features of the thus illustrated procedure are depicted with dashed lines.

As shown in FIG. 4, such exemplary procedure comprises an operation of determining whether power control for the at least two uplink carriers complying with the acquired at least one output power restriction value is feasible based on network conditions.

In this regard, transmission mode control in terms of switching between transmission modes is triggered, it is determined whether or not the device/terminal is in such network conditions that the power restriction/s according to the acquired output power restriction value/s could be satisfied. Stated in other words, it is determined whether or not the (power-related) rule defined by the acquired output power restriction value/s for a combination of uplink carriers could be met by the device/terminal.

For such determination according to exemplary embodiments of the present invention, feasibility of a corresponding power control is verified. Namely, it is verified whether power control for the at least two uplink carriers (for which any acquired output power restriction value applies) is feasible such that a power restriction according to any acquired output power restriction value could be complied with based on prevailing network conditions.

According to exemplary embodiments of the present invention, power control feasibility determination may be accomplished by verifying the possibility of splitting any output power restriction value over the (its) at least two uplink carriers based on at least one of one or more device properties of the terminal device, one or more interference conditions on at least one of a downlink carrier and a reception band of the terminal device, and one or more performance requirements of at least one of a downlink carrier and a reception band of the terminal device.

Accordingly, when it is possible to perform power control for multiple uplink carriers (e.g. to split the restricted output power over multiple uplink carriers) such that the device/terminal is able to perform an uplink carrier combination transmission mode in an appropriate manner (i.e. while complying with any relevant requirements/conditions), the transmission mode control results in the uplink carrier combination transmission mode. Otherwise, the transmission mode control results in the single uplink carrier transmission mode.

Depending on the current transmission mode, of the device terminal at the time of acquisition of the output power restriction value/s, the following variants may be applicable.

When non-feasibility of an appropriate power control satisfying power restrictions according to any acquired output power restriction value is determined, the transmission mode control switches from the uplink carrier combination transmission mode to the single uplink carrier transmission mode and/or signals an (explicit or implicit) indication of the necessity of such switching towards the network side, when the device/terminal operates in the uplink carrier combination transmission mode at the time of acquisition. Otherwise, when the device/terminal operates in the single uplink carrier transmission mode at the time of acquisition, the transmission mode control remains in the single uplink carrier transmission mode.

When feasibility of an appropriate power control satisfying power restrictions according to any acquired output power restriction value is determined, the transmission mode control switches from the single uplink carrier transmission mode to the uplink carrier combination transmission mode and/or signals an (explicit or implicit) indication of the possibility of such switching towards a network, when the device/terminal operates in the single uplink carrier transmission mode at the time of acquisition. Otherwise, when the device/terminal operates in the uplink carrier combination transmission mode at the time of acquisition, the transmission mode control remains in the uplink carrier combination transmission mode.

According to exemplary embodiments of the present invention, the aforementioned signaling of an indication could be accomplished in several ways. For example, the UE may indicate the necessity/possibility in an explicit action. Further, for example, the UE may not signal anything (in an explicit way), but may proceed to use a transmission mode or reporting which only applies for a configuration that is not what the network requested. Still further, for example, the UE may comply with the network directives, but may proceed to use such values (e.g. CQI, SRS) for reporting, which force the network to deduce that its configuration does not work (e.g. UE transmits UL SRS with such a low power that eNB can not detect it, leading the eNB to conclude that the UL is useless).

When signaling a corresponding indication of the necessity or possibility of some transmission mode switching towards the network, the network (e.g. the eNB) may take corresponding measures in response thereto. For example, the eNB may reconfigure power restrictions (e.g. to avoid an unfavorable switching from multiple UL mode to single UL mode), execute certain controls with respect to the device/terminal and/or other entities in the network for making adjustments to the new transmission mode of the device/terminal, and the like. Further, the eNB may explicitly instruct a corresponding transmission mode switch at the device/terminal, and/or inform other entities, respectively.

Also, the device/terminal may make a signaling to the network when the transmission mode control resulted in the maintenance of the current transmission mode. In this case as well, the network (e.g. the eNB) may take corresponding measures in response thereto. For example, the eNB may reconfigure power restrictions (e.g. to enable a favorable switching from single UL mode to multiple UL mode), execute certain controls with respect to the device/terminal and/or other entities in the network, and/or inform other entities thereof.

According to exemplary embodiments of the present invention, after transmission mode control as outlined above, the device/terminal may perform power control using the acquired at least one output power restriction value. Namely, in the single uplink carrier transmission mode a corresponding power control may be performed for the single uplink carrier, and in the uplink carrier combination transmission mode a corresponding power control may be performed for the at least two uplink carriers being combined. In the uplink carrier combination transmission mode, such power control may also comprise a power splitting as outlined above.

In terms of power control, when a respective output power restriction value is represented as an indication of a maximum allowable output power value of the combination of uplinks, the power control is performed such that the cumulative output power for the single uplink carrier or the combination of the uplink carriers is equal to or less than the output power restriction value. When a respective output power restriction value is represented as an indication of a maximum output power reduction value of the combination of uplink, the power control is performed such that the cumulative output power for the single uplink carrier or the combination of the uplink carriers is equal to or less than the difference between a maximum output power value and the output power restriction value.

In view of the above, according to exemplary embodiments of the present invention, flexibility in transmission mode control in the context of uplink carrier combination or aggregation could be achieved, while avoiding coverage problems. Namely, by acquiring the value C for the device/terminal, there is flexibility for the device/terminal to control an appropriate transmission mode.

In the following, two exemplary use cases for exemplary embodiments of the present invention are given.

Figure 5:
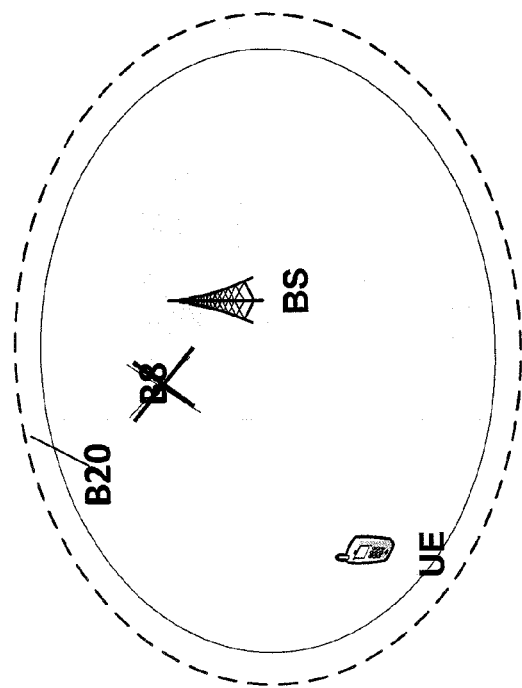
FIG. 5 shows a diagram of an example of coverage areas for an uplink carrier combination transmission mode and a single uplink carrier transmission mode, for which exemplary embodiments of the present invention are applicable.
Figure 5:
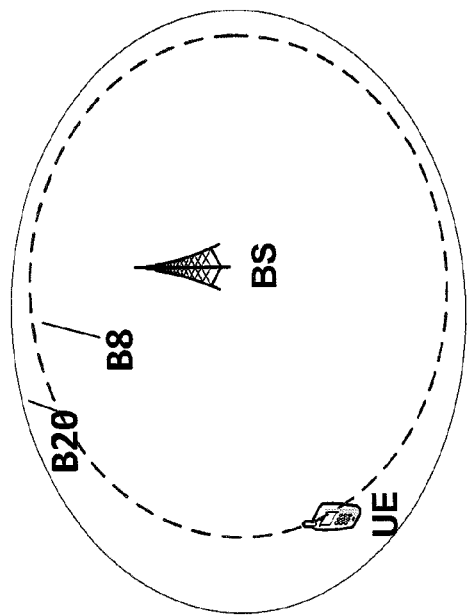

FIG. 5 shows a diagram of an example of coverage areas for an uplink carrier combination transmission mode and a single uplink carrier transmission mode, for which exemplary embodiments of the present invention are applicable.

The example of FIG. 5 specifically relates to an exemplary use case in the context of a transmission mode control from the uplink carrier combination transmission mode to the single uplink carrier transmission mode.

In the example of FIG. 5, a carrier aggregation scenario with two 3GPP-standardized bands B8 and B20 in the 1 GHz range (i.e. two low-range bands) is assumed, and it is assumed that a single base station BS is used for UE-BS transmission on these two bands. As the two bands have a similar frequency, the radiuses of coverage for the two bands are rather similar, but differ from each other due to different propagation losses. In this case, as outlined above, it may be assumed that the BS signals an output power restriction value C=52 dBm for $2*P_8+P_{20}$ with respect to IMD3.

Such value C applicable for the combination of bands $B_8$ and $B_{20}$ can be used as a trigger for transmission mode control at the UE. Specifically, in case the UE is in such network conditions that required power restrictions cannot be met (e.g. when the network asks to increase power/powers in a way that (for instance C=52 dB) for $2*P_8+P_{20}$ can not be satisfied), then the UE can either configure itself into a single UL mode and/or signal such configuration requirement to the network in an explicit or implicit way as outlined above.

In the example of FIG. 5, the UE decides to drop uplink band B8 and to maintain uplink band B20 which may provide for an increased coverage accordingly. The increased coverage of the remaining uplink band/s (only one UL needed to be maintained), results from the fact that all the output power (having to be split to multiple ULs in UL carrier combination) can be assigned to a single UL, i.e. a single output connector/antenna of the UE.

The decision on which one of the multiple UL carriers to drop may be based on network conditions. Such network conditions could for example involve propagation characteristics on the individual carriers (including e.g. distance between UE and BS, interference, etc.), operating bands (and characteristics thereof) except for those of the combined carriers (e.g. the ISM band), and so on.

For example, in a case where B8 and B20 are being aggregated and the UE moves out from the B8 coverage area (as indicated on the left hand side of FIG. 5), then—after transmission mode switching—there is no need to split the maximum output power between antennas, and all the power (e.g. +23 dBm) can be transmitted via the remaining B20 UL, thus increasing the coverage area thereof (as indicated on the right hand side of FIG. 5). In this case, the restriction of maximum output power per band (e.g. 20 dB as assumed above) may no longer be valid.

Figure 6:
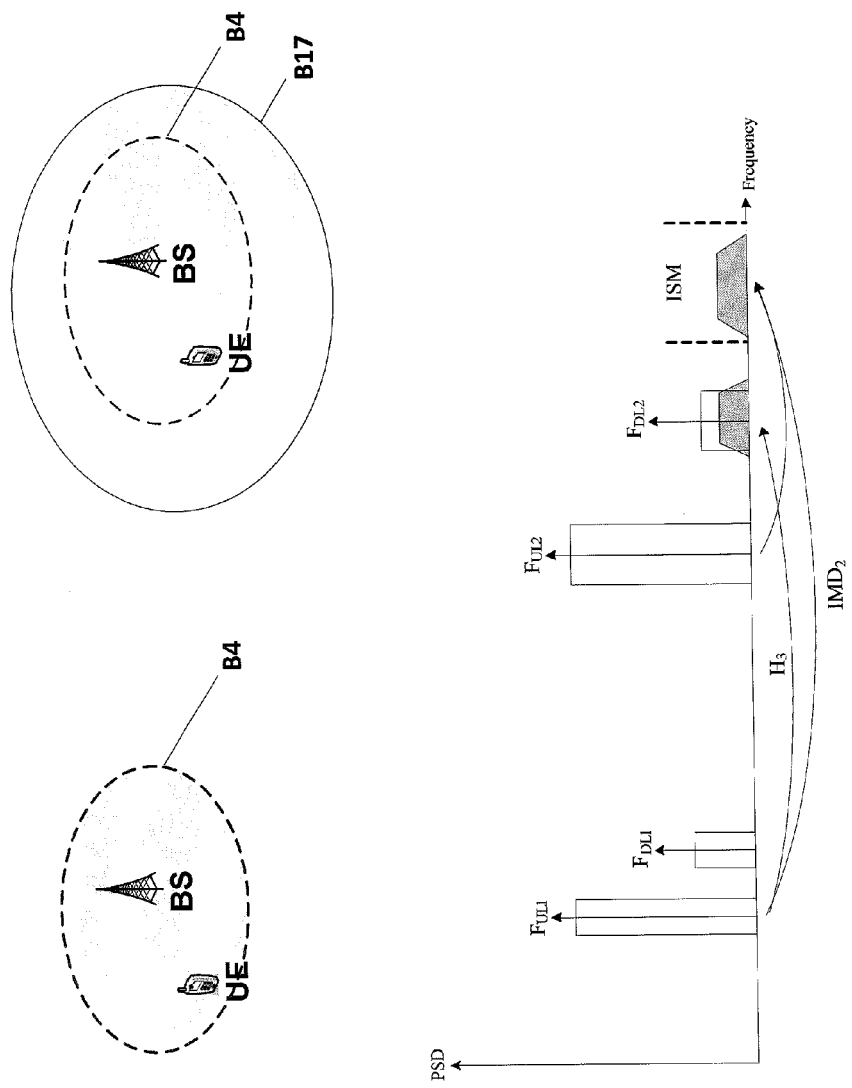
FIG. 6 shows a diagram of an example of third order harmonic distortion on a downlink band and second order intermodulation distortion on a reception band, for which exemplary embodiments of the present invention are applicable.

FIG. 6 shows a diagram of an example of third order harmonic distortion on a downlink band and second order intermodulation distortion on a reception band, for which exemplary embodiments of the present invention are applicable.

The example of FIG. 6 specifically relates to an exemplary use case in the context of a transmission mode control from the single uplink carrier transmission mode to the uplink carrier combination transmission mode.

In the example of FIG. 6 (as indicated on the left hand side at the top of FIG. 6), a single UL carrier mode on 3GPP-standardized band B4 is assumed, wherein the band B4 resides in the 2 GHz range (i.e. a high-range band). In this case, as outlined above, it may be assumed that the BS signals an output power restriction value C=52 dBm for $2*P_4+P_{17}$ (as the UE is operable for a combination of such bands) with respect to IMD3.

Such value C applicable for the combination of bands $B_4$ and $B_{17}$ can be used as a trigger for transmission mode control at the UE. Specifically, in case the UE is in such network conditions that required power restrictions can be met (e.g. when the network asks to increase power/powers in a way that (for instance C=52 dB) for $2*P_8+P_{20}$ can be satisfied) in an UL carrier combination with bands $B_4$ and $B_{17}$, then the UE can either configure itself into a multiple UL/UL combination mode and/or signal such configuration possibility to the network in an explicit or implicit way as outlined above.

In such case (as indicated on the right hand side at the top of FIG. 6), a carrier aggregation scenario with two 3GPP-standardized bands may be adopted, wherein the band B17 resides in the 1 GHz range (i.e. a low-range band), and it is assumed that a single base station BS is used for UE-BS transmission on these two bands. As the two bands have a quite different frequency, the radiuses of coverage for the two bands are quite different as well. Accordingly, an extension of the coverage area could be achieved by the transmission mode control in such case.

Generally, as outlined above, the decision on the possibility of a transmission mode switching may be based on network conditions. Such network conditions could for example involve propagation characteristics on the individual carriers (including e.g. distance between UE and BS, interference, etc.), operating bands (and characteristics thereof) except for those of the combined carriers (e.g. the ISM band), and so on.

In a basic form, the UE knows its TX power of the single UL carrier, e.g. on band $B_4$, and could thus deduce whether it could meet the C-based rule with 2 ULs (on a combination of bands for which the value C is applicable). That is, it is to be deduced whether the needed TX power of the other UL, e.g. on band $B_{17}$, would be such that the UE could still meet the C-based rule.

Yet, as illustrated at the bottom of FIG. 6, two kinds of distortion may be relevant in such case. On the one hand, the ISM suffers from desensitization due to (part of the) second order intermodulation of the combination of uplink carriers in the band B17 (denoted as UL1) and B4 (denoted as UL2). On the other hand, (part of) the third harmonic (H3) of the uplink of the band B17 hits the downlink of the band B4, thus suffering from desensitization as well.

Accordingly, besides its known TX power of the single UL carrier, e.g. on band $B_4$, the UE may also consider potential interference conditions and/or performance requirements on its own DL carriers/bands and/or another reception band as a further network condition. Such reception band may be a band (such as the 2.4-GHz ISM band) of another radio network or radio access technology.

If case such interference conditions and/or performance requirements on its own DL carriers/bands and/or another reception band could not be met in case of operation in a multiple UL/UL combination mode, the UE may determine non-feasibility of an appropriate power control satisfying power restrictions according to any acquired output power restriction value (although feasibility might be determined when only considering power requirements of the carriers to be potentially combined as such).

That is to say, in some use case, interference to DL transmission and/or an alternate RAT radio (e.g. WLAN) may prevent use of UL CA. When the alternate radio use case allows or its use is terminated, then it is only to be deduced whether the needed TX power of the other UL, e.g. on band $B_{17}$, would be such that the UE could still meet the C-based rule.

Generally, it is to be noted that the above examples commonly assume a combination of two uplinks or two uplink carriers, respectively. Such assumption is made only by way of example in an effort to simplify explanation of the principles of the present invention and its embodiments. Irrespective thereof, any number of uplinks or uplink carriers could be combined and corresponding output power restriction values could equally be calculated, signaled and applied as well. That is to say, exemplary embodiments of the present invention are not limited to a specific number of uplinks or uplink carriers to be combined.

Further, it is noted that the above examples mainly relate to second and third order intermodulation. Such relation is made only by way of example in an effort to simplify explanation of the principles of the present invention and its embodiments. Irrespective thereof, any kind, type, source, modulation and order of intermodulation could be equally considered as well. That is to say, exemplary embodiments of the present invention are not limited to a specific order intermodulation to be considered.

Still further, it is noted that the above examples are mainly described with respect to intermodulation distortion and harmonic distortion. Yet, it is to be noted that the principles of the present invention are equally applicable to any other distortion/interference sources as well. According to exemplary embodiments of the present invention, at least one distortion/interference component may comprise one or more of an intermodulation power, a harmonic power, a fundamental power, a fundamental channel leakage power (e.g. ACLR power), and a harmonic channel leakage power (e.g. harmonic fundamental ACLR power) of the at least one uplink band of the terminal device. Stated in other words, the source of distortion/interference is not relevant for the applicability of exemplary embodiments of the present invention.

Generally, the above-described procedures and functions may be implemented by respective functional elements, processors, or the like, as described below.

While in the foregoing exemplary embodiments of the present invention are described mainly with reference to methods, procedures and functions, corresponding exemplary embodiments of the present invention also cover respective apparatuses, network nodes and systems, including both software, algorithms, and/or hardware thereof.

Respective exemplary embodiments of the present invention are described below referring to FIG. 7, while for the sake of brevity reference is made to the detailed description with regard to FIGS. 1 to 6.

Figure 7:
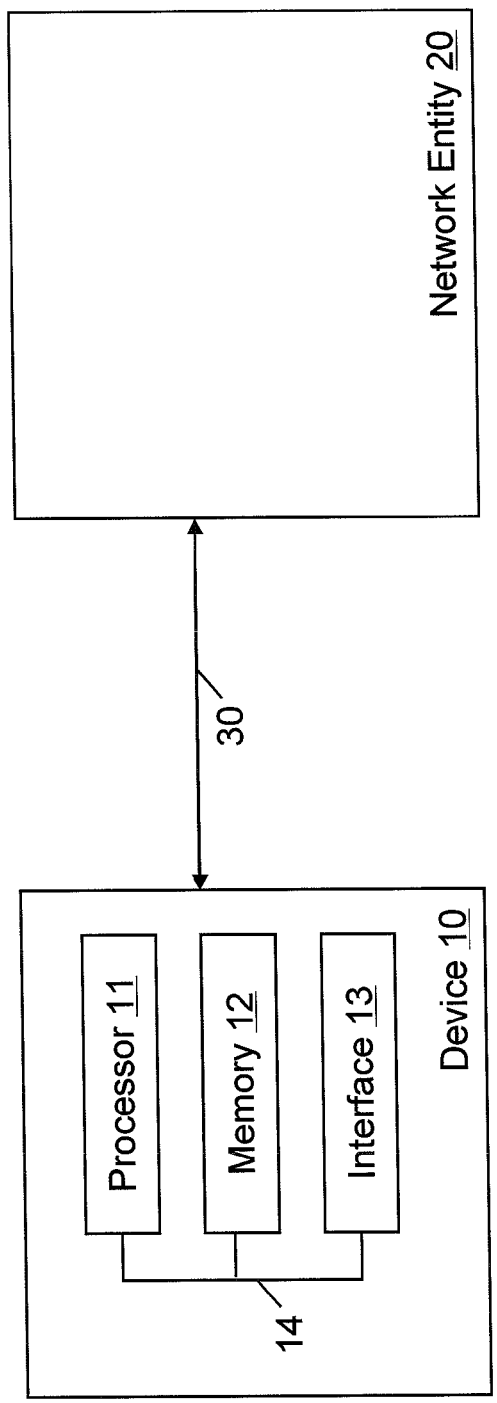
FIG. 7 shows a schematic block diagram illustrating exemplary apparatuses according to exemplary embodiments of the present invention.

In FIG. 7 below, which is noted to represent a simplified block diagram, the solid line blocks are basically configured to perform respective operations as described above. The entirety of solid line blocks are basically configured to perform the methods and operations as described above, respectively. With respect to FIG. 7, it is to be noted that the individual blocks are meant to illustrate respective functional blocks implementing a respective function, process or procedure, respectively. Such functional blocks are implementation-independent, i.e. may be implemented by means of any kind of hardware or software, respectively. The arrows and lines interconnecting individual blocks are meant to illustrate an operational coupling there-between, which may be a physical and/or logical coupling, which on the one hand is implementation-independent (e.g. wired or wireless) and on the other hand may also comprise an arbitrary number of intermediary functional entities not shown. The direction of arrow is meant to illustrate the direction in which certain operations are performed and/or the direction in which certain data is transferred.

Further, in FIG. 7, only those functional blocks are illustrated, which relate to any one of the above-described methods, procedures and functions. A skilled person will acknowledge the presence of any other conventional functional blocks required for an operation of respective structural arrangements, such as e.g. a power supply, a central processing unit, respective memories or the like. Among others, memories are provided for storing programs or program instructions for controlling the individual functional entities to operate as described herein.

FIG. 7 shows a schematic block diagram illustrating exemplary apparatuses according to exemplary embodiments of the present invention.

In view of the above, the thus described apparatuses 10 and 20 are suitable for use in practicing the exemplary embodiments of the present invention, as described herein.

The thus described apparatus 10 may represent a (part of a) device or terminal such as a mobile station MS or user equipment UE or a modem (which may be installed as part of a MS or UE, but may be also a separate module, which can be attached to various devices), and may be configured to perform a procedure and/or functionality as described in conjunction with any one of FIGS. 2 to 4. The thus described apparatus 20 may represent a (part of a) network entity, such as a base station or access node or any network-based controller, e.g. an eNB, and may be configured to perform a procedure and/or functionality as described in conjunction with FIG. 3, while no further details thereof are given.

As indicated in FIG. 7, according to exemplary embodiments of the present invention, the apparatus 10 comprises a processor 11, a memory 12 and an interface 13, which are connected by a bus 14 or the like, and the apparatuses may be connected via link A, respectively.

The processor 11 and/or the interface 13 may also include a modem or the like to facilitate communication over a (hardwire or wireless) link, respectively. The interface 13 may include a suitable transceiver coupled to one or more antennas or communication means for (hardwire or wireless) communications with the linked or connected device(s), respectively. The interface 13 is generally configured to communicate with at least one other apparatus, i.e. the interface thereof.

The memory 12 may store respective programs assumed to include program instructions or computer program code that, when executed by the respective processor, enables the respective electronic device or apparatus to operate in accordance with the exemplary embodiments of the present invention.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing").

According to exemplary embodiments of the present invention, an apparatus representing the terminal 10 comprises at least one processor 11, at least one memory 12 including computer program code, and at least one interface 13 configured for communication with at least another apparatus. The processor (i.e. the at least one processor 11, with the at least one memory 12 and the computer program code) is configured to perform acquiring at least one output power restriction value for a cumulative output power for a combination of at least two uplink carriers of a terminal device, said two uplink carriers operating on different bands (thus the apparatus comprising corresponding means for acquiring), at the terminal device, and performing transmission mode control in terms of switching between an uplink carrier combination transmission mode and a single uplink carrier transmission mode using the acquired at least one output power restriction value at the terminal device (thus the apparatus comprising corresponding means for performing transmission mode control).

For further details regarding the operability/functionality of the individual apparatuses, in particular the transmission mode control and the power control of the apparatus 10, reference is made to the above description in connection with any one of FIGS. 1 to 6, respectively.

According to exemplarily embodiments of the present invention, a system may comprise any conceivable combination of the thus depicted devices/apparatuses and other network elements, which are configured to cooperate with any one of them.

In general, it is to be noted that respective functional blocks or elements according to above-described aspects can be implemented by any known means, either in hardware and/or software/firmware, respectively, if it is only adapted to perform the described functions of the respective parts. The mentioned method steps can be realized in individual functional blocks or by individual devices, or one or more of the method steps can be realized in a single functional block or by a single device.

Generally, any structural means such as a processor or other circuitry may refer to one or more of the following: (a) hardware-only circuit implementations (such as implementations in only analog and/or digital circuitry) and (b) combinations of circuits and software (and/or firmware), such as (as applicable): (i) a combination of processor(s) or (ii) portions of processor(s)/software (including digital signal processor(s)), software, and memory(ies) that work together to cause an apparatus, such as a mobile phone or server, to perform various functions) and (c) circuits, such as a microprocessor(s) or a portion of a microprocessor(s), that require software or firmware for operation, even if the software or firmware is not physically present. Also, it may also cover an implementation of merely a processor (or multiple processors) or portion of a processor and its (or their) accompanying software and/or firmware, any integrated circuit, or the like.

Generally, any procedural step or functionality is suitable to be implemented as software/firmware or by hardware without changing the idea of the present invention. Such software may be software code independent and can be specified using any known or future developed programming language, such as e.g. Java, C++, C, and Assembler, as long as the functionality defined by the method steps is preserved. Such hardware may be hardware type independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC. (Application Specific IC (Integrated Circuit)) components, FPGA (Field-programmable Gate Arrays) components, CPLD (Complex Programmable Logic Device) components or DSP (Digital Signal Processor) components. A device/apparatus may be represented by a semiconductor chip, a chipset, or a (hardware) module comprising such chip or chipset; this, however, does not exclude the possibility that a functionality of a device/apparatus or module, instead of being hardware implemented, be implemented as software in a (software) module such as a computer program or a computer program product comprising executable software code portions for execution/being run on a processor. A device may be regarded as a device/apparatus or as an assembly of more than one device/apparatus, whether functionally in cooperation with each other or functionally independently of each other but in a same device housing, for example.

Apparatuses and/or means or parts thereof can be implemented as individual devices, but this does not exclude that they may be implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, the present invention and/or exemplary embodiments thereof provide measures for enabling transmission mode control for inter-band multi-carrier capable devices, such as e.g. inter-band carrier aggregation capable devices. Such measures may exemplarily comprise acquiring at least one output power restriction value for a cumulative output power for a combination of at least two uplink carriers of a terminal device, said two uplink carriers operating on different bands, at the terminal device, and performing transmission mode control in terms of switching between an uplink carrier combination transmission mode and a single uplink carrier transmission mode using the acquired at least one output power restriction value at the terminal device.

The measures according to exemplary embodiments of the present invention may be applied for any kind of network environment, such as for example for communication systems in accordance with 3GPP RAN1/RAN2/RAN3/RAN4 standards, i.e. LTE standards of release Oct. 11, 2012/ . . . (including LTE-Advanced and its evolutions) and/or UMTS standards and/or WCDMA standards and/or HSPA standards. In particular, the measures according to exemplary embodiments of the present invention may be applied to inter-band carrier aggregation which is a feature of 3GPP LTE standards of release Oct. 11, 2012 and onwards.

Even though the present invention and/or exemplary embodiments are described above with reference to the examples according to the accompanying drawings, it is to be understood that they are not restricted thereto. Rather, it is apparent to those skilled in the art that the present invention can be modified in many ways without departing from the scope of the inventive idea as disclosed herein.

| List of acronyms and abbreviations | |
| --- | --- |
| 3GPP | Third Generation Partnership Project |
| ACLR | Adjacent Channel Leakage Ratio |
| A-MPR | Additional Maximum Power Reduction |
| CA | Carrier Aggregation |
| CC | Component Carrier |
| CQI | Channel Quality Indicator |
| DL | Downlink |
| eNB | evolved Node B (E-UTRAN base station) |
| E-UTRAN | Evolved UTRAN |
| HSPA | High Speed Packet Access |
| IM | Intermodulation |
| IMD | Intermodulation distortion |
| ISM band | Industrial, Scientific and Medical band |
| LTE | Long Term Evolution |
| LTE-A | Long Term Evolution Advanced |
| NS | Network Signaling |
| PSD | Power Spectral Density |
| RAT | Radio Access Technology |
| RB | Resource Block |
| SRS | Sounding Reference Signal |
| TX | Transmitter/Transmission |
| UE | User Equipment |
| UL | Uplink |
| UMTS | Universal Mobile Telecommunications System |
| UTRAN | Universal Terrestrial Radio Access Network |
| WCDMA | Wideband Code Division Multiple Access |
| WLAN | Wireless Local Area Network |

What is claimed is:

1. A method, comprising:

acquiring at least one output power restriction value for a cumulative output power for a combination of at least two uplink carriers of a terminal device, said two uplink carriers operating on different bands, at the terminal device, and performing transmission mode control in terms of switching between an uplink carrier combination transmission mode and a single uplink carrier transmission mode using the acquired at least one output power restriction value at the terminal device, wherein the at least one output power restriction value is based on at least one intermodulation power calculation, which is based on using at least a second order intermodulation power, transmit powers of more than one uplink carrier of the terminal device, antenna isolation of the terminal device and intermodulation performance of the terminal device.

2. The method according to claim 1, wherein the acquiring comprises receiving a signaling from a network side and/or a pre-configuration, and/or the acquiring comprises acquiring band-specific output power restriction values for the at least two uplink carriers, and the transmission mode control is performed using the acquired at least one output power restriction value and the acquired band-specific output power restriction values at the terminal device.

3. The method according to claim 1, wherein the at least one output power restriction value is based on the at least one intermodulation power calculation for the intermodulation power of the at least two uplink carriers, an allowable intermodulation power, and one or more related device-specific parameters of the terminal device and/or movement-related information of the terminal device.

4. The method according to claim 1, wherein the at least one output power restriction value comprises at least one of an output power restriction value for each combination of uplink carriers of the terminal device, an output power restriction value for those combinations of uplink carriers of the terminal device, which cause intermodulation distortion on at least one of a downlink carrier and a reception band of the terminal device, and an output power restriction value for a group of combinations of uplink carriers of the terminal device, which cause a specific order intermodulation distortion on at least one of a downlink carrier and a reception band of the terminal device.

5. The method according to claim 1, wherein the at least one output power restriction value indicates at least one of a maximum allowable output power value, and a maximum output power reduction value.

6. The method according to claim 1, wherein the transmission mode control comprises determining whether power control for the at least two uplink carriers complying with the acquired at least one output power restriction value is feasible based on network conditions.

7. The method according to claim 6, wherein power control comprises
splitting the at least one output power restriction value over the at least two uplink carriers of the terminal device based on at least one of one or more device properties of the terminal device, one or more interference conditions on at least one of a downlink carrier and a reception band of the terminal device, and one or more performance requirements of at least one of a downlink carrier and a reception band of the terminal device.

8. The method according to claim 6, wherein the transmission mode control comprises
switching from the uplink carrier combination transmission mode to the single uplink carrier transmission mode and/or signaling an indication of the necessity of such switching towards a network, when the terminal device operates in the uplink carrier combination transmission mode when acquiring the at least one output power restriction value, and it is determined that power control for the at least two uplink carriers complying with the acquired at least one output power restriction value is not feasible, or
switching from the single uplink carrier transmission mode to the uplink carrier combination transmission mode and/or signaling an indication of the possibility of such switching towards a network, when the terminal device operates in the single uplink carrier transmission mode when acquiring the at least one output power restriction value, and it is determined that power control for the at least two uplink carriers complying with the acquired at least one output power restriction value is feasible.

9. The method according to claim 1, wherein
the method is operable at or by a terminal, user equipment, mobile station or modem, and/or
the method is operable in at least one of a LTE and a LTE-A cellular system, and/or
the combination of the at least two uplink carriers of the terminal device, for which an output power restriction value for a cumulative output power is calculated, constitutes an inter-band carrier aggregation.

10. A non-transitory computer program product comprising a set of instructions which, when executed on an apparatus, is configured to cause the apparatus to carry out the method according to claim 1.

11. The non-transitory computer program product according to claim 10, embodied as a computer-readable medium.

12. An apparatus comprising:
at least one processor,
at least one memory including computer program code, and
at least one interface configured for communication with at least another apparatus,
the at least one processor, with the at least one memory and the computer program code, being configured to cause the apparatus to perform:
acquiring at least one output power restriction value for a cumulative output power for a combination of at least two uplink carriers of a terminal device, said two uplink carriers operating on different bands, at the terminal device, and
performing transmission mode control in terms of switching between an uplink carrier combination transmission mode and a single uplink carrier transmission mode using the acquired at least one output power restriction value at the terminal device,
wherein the at least one output power restriction value is based on at least one intermodulation power calculation, which is based on using at least a second order intermodulation power, transmit powers of more than one uplink carrier of the terminal device, antenna isolation of the terminal device and intermodulation performance of the terminal device.

13. The apparatus according to claim 12, wherein the at least one processor, with the at least one memory and the computer program code, is configured to cause the apparatus to perform
the acquiring comprising receiving a signaling from a network side and/or a pre-configuration, and/or
the acquiring comprising acquiring band-specific output power restriction values for the at least two uplink carriers, and performing the transmission mode control using the acquired at least one output power restriction value and the acquired band-specific output power restriction values at the terminal device.

14. The apparatus according to claim 12, wherein the at least one output power restriction value is based on the at least one intermodulation power calculation for the intermodulation power of the at least two uplink carriers, an allowable intermodulation power, and one or more related device-specific parameters of the terminal device and/or movement-related information of the terminal device.

15. The apparatus according to claim 12, wherein the at least one output power restriction value comprises at least one of
an output power restriction value for each combination of uplink carriers of the terminal device,
an output power restriction value for those combinations of uplink carriers of the terminal device, which cause intermodulation distortion on at least one of a downlink carrier and a reception band of the terminal device, and
an output power restriction value for a group of combinations of uplink carriers of the terminal device, which cause a specific order intermodulation distortion on at least one of a downlink carrier and a reception band of the terminal device.

16. The apparatus according to claim 12, wherein the at least one output power restriction value indicates at least one of
a maximum allowable output power value, and
a maximum output power reduction value.

17. The apparatus according to claim 12, wherein the at least one processor, with the at least one memory and the computer program code, is configured to cause the apparatus to perform for the transmission mode control:
determining whether power control for the at least two uplink carriers complying with the acquired at least one output power restriction value is feasible based on network conditions.

18. The apparatus according to claim 17, wherein the at least one processor, with the at least one memory and the computer program code, is configured to cause the apparatus to perform for the power control:
splitting the at least one output power restriction value over the at least two uplink carriers of the terminal device based on at least one of one or more device properties of the terminal device, one or more interference conditions on at least one of a downlink carrier and a reception band of the terminal device, and one or more performance requirements of at least one of a downlink carrier and a reception band of the terminal device.

19. The apparatus according to claim 17, wherein the at least one processor, with the at least one memory and the computer program code, is configured to cause the apparatus to perform for the transmission mode control:

switching from the uplink carrier combination transmission mode to the single uplink carrier transmission mode and/or signaling an indication of the necessity of such switching towards a network, when the terminal device operates in the uplink carrier combination transmission mode when acquiring the at least one output power restriction value, and it is determined that power control for the at least two uplink carriers complying with the acquired at least one output power restriction value is not feasible, or switching from the single uplink carrier transmission mode to the uplink carrier combination transmission mode and/or signaling an indication of the possibility of such switching towards a network, when the terminal device operates in the single uplink carrier transmission mode when acquiring the at least one output power restriction value, and it is determined that power control for the at least two uplink carriers complying with the acquired at least one output power restriction value is feasible.

20. The apparatus according to claim 12, wherein the apparatus is operable as or at a terminal, user equipment, mobile station or modem, and/or the apparatus is operable in at least one of a LTE and a LTE-A cellular system, and/or the combination of the at least two uplink carriers of the terminal device, for which an output power restriction value for a cumulative output power is calculated, constitutes an inter-band carrier aggregation.

* * * * *